(12) United States Patent
Batista (10) Patent No.: US 12,175,442 B2
(45) Date of Patent: Dec. 24, 2024

(54) SERVICE APPLICATION SYSTEM FOR PAYMENT TERMINALS

(71) Applicant: BANKS AND ACQUIRERS INTERNATIONAL HOLDING, Paris (FR)

(72) Inventor: Amilcar Batista, Paris (FR)

(73) Assignee: BANKS AND ACQUIRERS INTERNATIONAL HOLDING (FR)

( * ) Notice: Subject to any disclaimer, the term of this patent is extended or adjusted under 35 U.S.C. 154(b) by 220 days.

(21) Appl. No.: 17/621,337

(22) PCT Filed: Jun. 17, 2020

(86) PCT No.: PCT/FR2020/051051
§ 371 (c)(1),
(2) Date: Dec. 21, 2021

(87) PCT Pub. No.: WO2020/254761
PCT Pub. Date: Dec. 24, 2020

(65) Prior Publication Data
US 2022/0366393 A1     Nov. 17, 2022

(30) Foreign Application Priority Data

Jun. 21, 2019  (FR) ...................................... 1906735

(51) Int. Cl.
*G06Q 20/20* (2012.01)
(52) U.S. Cl.
CPC .................................. *G06Q 20/202* (2013.01)
(58) Field of Classification Search
CPC .... G06Q 20/202; G06Q 10/0633; G06F 8/60; G06F 8/34; G07F 9/006; G07G 1/0009
See application file for complete search history.

(56) References Cited

U.S. PATENT DOCUMENTS

| 6,173,438 | B1 * | 1/2001 | Kodosky | ................. | G06F 8/34 |
| | | | | | 717/109 |
| 6,243,092 | B1 * | 6/2001 | Okita | ...................... | G06F 8/34 |
| | | | | | 715/965 |

(Continued)

FOREIGN PATENT DOCUMENTS

| FR | 2806493 A1 * | 9/2001 | ............... G06F 8/34 |
| KR | 100742022 B1 * | 7/2007 | |

(Continued)

OTHER PUBLICATIONS

IVI checkmate and groupe ingenico announce WAP capable wireless transaction terminals. (Oct. 17, 2000). PR Newswire Retrieved from https://www.proquest.com/wire-feeds/ivi-checkmate-groupe-ingenico-announce-wap/docview/449272228/se-2 (Year: 2000).*

(Continued)

*Primary Examiner* — Ashford S Hayles
(74) *Attorney, Agent, or Firm* — Dilworth IP, LLC (57) ABSTRACT

A platform for services able to be integrated into a payment solution. The platform also offers a graphical programming tool for payment solutions, which allows a user of the platform to define a payment solution by integrating the desired services and by parameterizing them. This graphical programming tool may be used without requiring any computing knowledge. The graphical programming tool makes it possible to generate two pieces of software, for example script-based software, one intended to be executed on the payment terminal and to collaborate with the other one on a server of the service platform in order to provide a payment solution.

18 Claims, 5 Drawing Sheets

(56) References Cited

U.S. PATENT DOCUMENTS

| | | | |
|---|---|---|---|
| 6,243,861 B1* | 6/2001 | Nitta | G06F 8/34 717/109 |
| 6,889,375 B1* | 5/2005 | Chan | G06Q 10/06 717/113 |
| 7,565,640 B2* | 7/2009 | Shukla | G06Q 10/06 717/109 |
| 7,613,671 B2* | 11/2009 | Serrano-Morales | G06Q 30/00 706/47 |
| 2002/0032655 A1* | 3/2002 | Antonin | G07F 19/207 705/43 |
| 2002/0091990 A1* | 7/2002 | Little | G06F 8/10 703/22 |
| 2002/0175207 A1* | 11/2002 | Kashef | G06Q 20/105 235/380 |
| 2003/0037310 A1* | 2/2003 | Ge | G06F 8/34 717/113 |
| 2003/0126084 A1* | 7/2003 | Drummond | G06Q 20/00 707/E17.107 |
| 2005/0177816 A1* | 8/2005 | Kudukoli | G06F 8/34 717/136 |
| 2006/0031177 A1* | 2/2006 | Rule | G06Q 50/182 705/309 |
| 2006/0218061 A1* | 9/2006 | Mouline | G06Q 40/00 705/35 |
| 2006/0218228 A1* | 9/2006 | Mouline | G06Q 30/06 709/203 |
| 2007/0061777 A1* | 3/2007 | Vashi | G06Q 30/00 717/109 |
| 2007/0069015 A1* | 3/2007 | Vernon | G06Q 20/18 235/383 |
| 2007/0150749 A1* | 6/2007 | Monaghan | G06F 8/34 713/189 |
| 2007/0276763 A1* | 11/2007 | Kleinman | G06Q 20/202 705/64 |
| 2008/0028057 A1* | 1/2008 | Reason | G06Q 20/20 709/223 |
| 2009/0013310 A1* | 1/2009 | Arner | G06F 8/38 717/120 |
| 2009/0119640 A1* | 5/2009 | Ramsey | G06F 8/34 717/109 |
| 2009/0132690 A1* | 5/2009 | Hafez | G06Q 30/0603 717/173 |
| 2010/0038424 A1* | 2/2010 | Bashan | G06K 7/0095 235/439 |
| 2010/0145854 A1* | 6/2010 | Messerges | G06Q 20/40 705/35 |
| 2010/0198728 A1* | 8/2010 | Aabye | G06Q 20/40 726/19 |
| 2010/0228683 A1* | 9/2010 | Ansley | G06Q 20/00 704/E15.001 |
| 2010/0305997 A1* | 12/2010 | Ananian | G06Q 10/0633 715/843 |
| 2012/0221304 A1* | 8/2012 | Zecheria | G06Q 10/06 703/6 |
| 2012/0290478 A1* | 11/2012 | Crofts | G06Q 20/322 705/44 |
| 2012/0291006 A1* | 11/2012 | Quine | G06F 9/45529 717/105 |
| 2013/0054682 A1* | 2/2013 | Malik | H04L 45/563 709/203 |
| 2013/0212004 A1* | 8/2013 | Itwaru | G06Q 20/0855 705/39 |
| 2013/0219217 A1* | 8/2013 | Seren | G06F 11/3664 714/E11.178 |
| 2013/0246345 A1* | 9/2013 | Eisler | G06F 16/93 707/608 |
| 2014/0089185 A1* | 3/2014 | Desai | G06Q 10/067 705/41 |
| 2014/0108263 A1* | 4/2014 | Ortiz | G06Q 20/322 705/44 |
| 2014/0237594 A1* | 8/2014 | Thakadu | G06F 21/52 726/23 |
| 2014/0372234 A1* | 12/2014 | Tikku | G06Q 20/027 705/21 |
| 2014/0372963 A1* | 12/2014 | Chandaria | G06F 8/00 717/100 |
| 2015/0287031 A1* | 10/2015 | Radu | G06Q 20/204 705/18 |
| 2015/0302398 A1* | 10/2015 | Desai | G06Q 20/322 705/41 |
| 2015/0309770 A1* | 10/2015 | Findlay | G06F 8/34 717/109 |
| 2015/0339107 A1 | 11/2015 | Krishnamurthy et al. | |
| 2016/0124627 A1* | 5/2016 | Beatty | G06Q 20/202 705/16 |
| 2016/0335454 A1* | 11/2016 | Choe | G06Q 30/018 |
| 2016/0378439 A1 | 12/2016 | Straub et al. | |
| 2017/0132627 A1* | 5/2017 | Phillips | G06Q 30/0613 |
| 2017/0140350 A1* | 5/2017 | Jamkhedkar | G06Q 20/3821 |
| 2017/0178121 A1* | 6/2017 | Roberts | G06Q 20/20 |
| 2017/0315782 A1* | 11/2017 | Chaudhry | G06F 9/4881 |
| 2018/0012213 A1* | 1/2018 | Adelgren | G06F 21/45 |
| 2018/0032975 A1* | 2/2018 | Wolter | G06Q 20/085 |
| 2018/0032980 A1* | 2/2018 | Rodriguez | G06Q 20/102 |
| 2018/0181378 A1* | 6/2018 | Bakman | G06F 8/38 |
| 2018/0349875 A1* | 12/2018 | Barnett | H04L 67/12 |
| 2019/0050776 A1* | 2/2019 | Chen | G06Q 10/0633 |
| 2019/0114598 A1* | 4/2019 | Subramaniam | G06Q 30/06 |
| 2019/0163769 A1* | 5/2019 | Hachem | G06F 16/254 |
| 2019/0251529 A1* | 8/2019 | Wolter | G06Q 20/20 |
| 2019/0377621 A1* | 12/2019 | Huang | G06F 3/0484 |
| 2019/0394054 A1* | 12/2019 | Pirzadeh | G06Q 20/3278 |
| 2020/0193408 A1* | 6/2020 | Hadley | G06Q 20/385 |

FOREIGN PATENT DOCUMENTS

| | | | | |
|---|---|---|---|---|
| WO | WO-0178020 A1 * | 10/2001 | | G06Q 20/341 |
| WO | WO-2004095352 A1 * | 11/2004 | | G06K 7/0004 |
| WO | 2013056104 A1 | 4/2013 | | |
| WO | WO-2015015406 A1 * | 2/2015 | | G06Q 20/00 |
| WO | WO-2018090083 A1 * | 5/2018 | | G06F 9/54 |

OTHER PUBLICATIONS

R. L. Henneman and D. M. Rubini, "New directions in transaction terminal interfaces," in AT&T Technical Journal, vol. 72, No. 3, pp. 50-56, May-Jun. 1993, doi: 10.1002/j.1538-7305.1993.tb00540.x. (Year: 1993).*

Written Opinion of the International Searching Authority in related PCT Application PCT/FR2020/051051; dated Nov. 4, 2021; 5 pages.

International Search Report in related PCT Application PCT/FR2020/051051; dated Nov. 4, 2021; 6 pages.

* cited by examiner

SERVICE APPLICATION SYSTEM FOR PAYMENT TERMINALS

TECHNICAL FIELD

This invention relates to the field of service applications for payment terminals.

BACKGROUND OF THE INVENTION

A payment terminal (or virtual payment terminal) is a computer device allowing a professional to manage the electronic payment of a good or service by a client. Payment is typically made using a bank card, smartphone or any other support hosting a payment means. The card, its holder and the transaction are authenticated and validated by the payment terminal through the use of a bank service, after presenting the card to the terminal, or manually entering the information concerning the holder's identification (card number, expiry date, holder's identifier, etc.). The payment terminal may consist of a dedicated computer device, a general-purpose computer device, such as for example a mobile phone, a computer tablet, a personal computer equipped with means for reading a smart card, a magnetic stripe card, a contactless card and, generally, means for reading information on a support allowing the bank service to identify a client (including a bar code or a QR code), or of an application providing access to the payment service (example: web browser) and connected to a computer network. The computer device is provided with a service application dedicated to the management of transactions.

The current payment context is characterised by the emergence of new payment means such as, for example, the payment solutions using connected objects such as smartphones equipped with payment capacities. We may mention the Apple Pay (registered trademark), Android Pay (registered trademark) solutions, international, regional or affinity electronic wallet solutions such as AliPay (registered trademark), WeChat Pay (registered trademark), Paypal (registered trademark), BlueCode (registered trademark), Paylib (registered trademark), etc. Numerous payment brands are also developing, such as, for example, VISA (registered trademark), VISA Electron (registered trademark), Mastercard (registered trademark), Maestro (registered trademark), Union Pay (registered trademark), Discover (registered trademark), American Express (registered trademark), Cartes bancaires (registered trademark), MultiBanco (registered trademark), Giromat (registered trademark), Giropay (registered trademark), etc. Payment-related services are also developing, such as payment in several times, payment in currency (DCC), deferred payment, etc.

The services related to the transaction as such are also developing, such as insurance for the good or service purchased, warranty extensions, tip payment. These related services may also concern the customer relation, such as for example loyalty programmes, reduction coupons, collection of customer opinions, etc. Other services may concern knowledge of the consumer and of their behaviour. The possibilities of payment-related services are constantly increasing.

In order to be offered to their clients more simply, intuitively and ergonomically, these services must be integrated in the payment terminal management application by the professional. Integrators or the payment terminal manufacturer itself must be contacted to do this, in order to develop a specific application corresponding to the professional's requirements. These developments are lengthy and expensive and must then be maintained by a professional. This cost, these delays and the lack of flexibility represent an obstacle to the rapid adoption by the professionals of the existing or future services.

SUMMARY OF THE INVENTION

This invention aims to remedy the above-mentioned disadvantages by proposing a platform of services that can be integrated in a payment or client interaction solution. The platform also offers a graphical programming tool for payment solutions, which allows a user of the platform to define the payment solutions by integrating the desired services and by parameterizing them. This graphical programming tool may be used without requiring any computing knowledge. The graphical programming tool makes it possible to generate at least two pieces of software, for example script-based software, one intended to be executed on the payment terminal and to collaborate with the other one on a server of the service platform in order to provide a payment solution.

Thus, a professional can quickly and easily define the payment solution adapted to their requirements. This solution can be quickly deployed. It can also be modified at any time by the professional in order to match their changing requirements.

DETAILED DESCRIPTION

Figure 1:
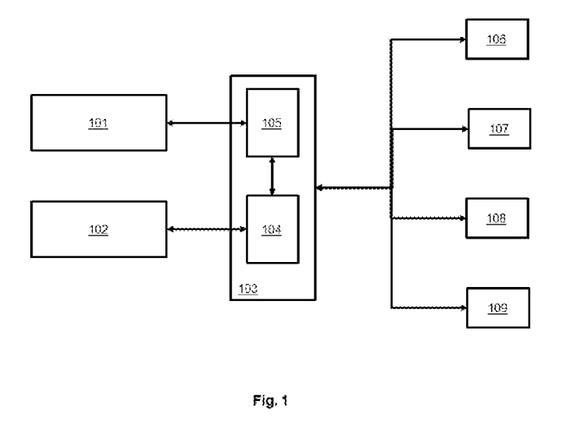
FIG. 1 shows the architecture of a service system for payment terminals according to an embodiment of the invention.

FIG. 1 shows the architecture of a service system for payment terminals according to an embodiment of the invention.

The system comprises a service platform 103. This service platform comprises a first execution module 105 used for the operation of payment services at a payment terminal 101. The service platform 103 also comprises a payment service programming module 104 to which a user, in other words a person operating a payment terminal 101 can connect from an information processing device 102. This device may typically consist of a personal computer, a tablet, or any other terminal that can connect to a data communication network such as the Internet. The information processing device is typically provided with an Internet client, such as a web browser, allowing the user to interact with the payment service programming module 104.

The service platform 103 is described logically herein. It may consist of one or more servers interacting to provide the service described. Similarly, only the aspects essential for the definition then for the execution of the payment service applications are described. The platform also comprises related services such as, for example, the authentication and management of users which are not described in detail.

The payment service programming module 104 allows the user to simply, intuitively and quickly program a payment service using basic services offered by the service platform 103. According to an embodiment of the invention, the payment service programming module offers graphical programming by configuring elementary services, connecting them and defining their parameters. Thus, a user can easily design a complete application for a payment terminal. Once defined, this complete application consists of two software modules, one intended to be executed on the payment terminal 101 and the other on the execution module 105. The two software modules then interact to execute the application together. In some embodiments, the application requires more than two software modules executed on different computer devices and interacting together.

At least some of the elementary services forming the payment terminal application can call one or more external services 106 to 109. These external services comprise for example Payment Service Providers (PSP), email services, Short Message Services (SMS), customer opinion collection and analysis services, commercial animation services (loyalty program, coupon management program, etc.), customer identification services (e.g. token management), etc. Thus, a user operating a terminal can use the platform to define a complete payment terminal application. This definition requires no specific programming knowledge and is quick and easy to use. Once the application has been defined, the platform generates all the software modules to be executed on the payment terminal. The platform also generates a second software module executed on the platform itself. The software modules intended for the payment terminal or, more generally, any computer device, are deployed on them. When the payment terminal is being used, the software module deployed on the terminal is executed, connects to the platform and cooperates with the software module executed on the platform to supply the services forming the application. Some of its services may use external services which interact with the service platform.

The user may therefore, at any time, define or modify their payment application to adapt to their changing requirements and offer their clients the required service level. New services emerging on the market may be offered quickly by integrating them into the service platform. As soon as they have been integrated into the service platform, the users can integrate them into their payment terminal applications.

Figure 2:
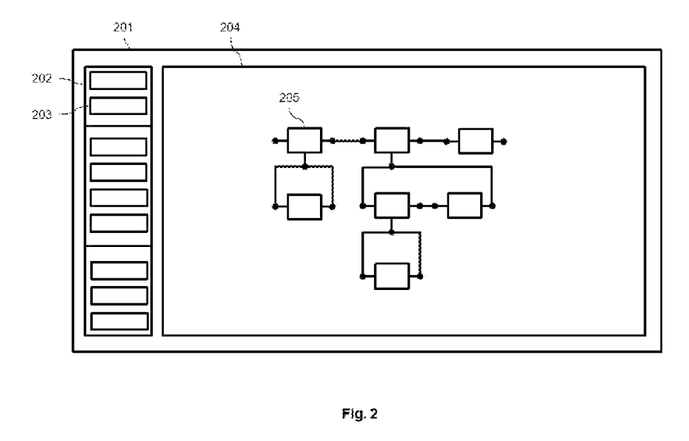
FIG. 2 shows an example of an interface for programming service applications for payment terminals.

FIG. 2 shows an example of an interface for programming service applications for payment terminals.

The graphical programming application used to program the service applications operates on a client-server mode between the client 102 used by the user and the programming module 104 on the service platform. The example described herein is based on the use of a standard web browser on the client 102 interacting with a programming module 104 developed as a web service on the platform. Any other implementation can obviously be considered, such as a native client interacting with a native application on the server side for example.

In this example, the programming interface comprises a main window 201 which comprises two sub-windows.

A first sub-window 202 comprises a list of the available elementary services 203. Advantageously, this list can be sorted by service type. Advantageously, the list can be hierarchised and display only the services of a given category at a given time so that the service required can be found easily if there is a large number of services.

A second sub-window 204 is used to edit the payment terminal service application. In this edit window 204, the user can configure services 205 selected from the list of services 202. Typically, the user can select a service from the list of services 202 and drag and drop it into the edit window 204. Once the service 205 has been dropped in the edit window, it reveals at least one entry point and one exit point, as well as any hooks. The user can then connect the entry and exit points of the various services to create their application. The services 205 also reveal, if necessary, a set of parameters allowing the user to customise this service to suit their requirements.

The interface also comprises, not shown on the figure, the checks used to save an application as well as generate and deploy the software modules generated on the payment terminal and on the platform. Advantageously, the software module intended for the payment terminal can be deployed over several payment terminals, for example in a store having several payment terminals or in a chain store.

Figure 3:
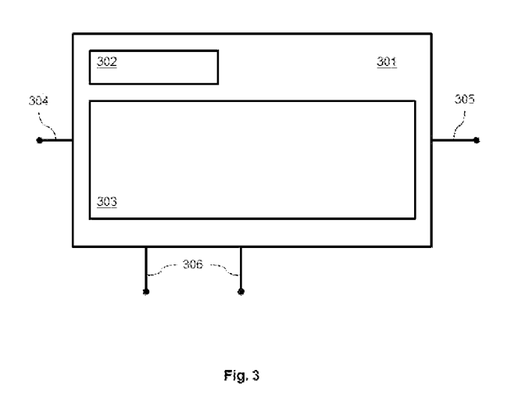
FIG. 3 shows a service as displayed in the edit window according to an embodiment of the invention.

FIG. 3 shows a service 301 as it is displayed in the edit window 204 according to an embodiment of the invention.

The service comprises at least one entry point 304 and at least one exit point 305. Depending on the service, there may be several exit points (e.g. exit point No. 1=transaction validated, exit point No. 2=transaction in error, exit point No. 3=transaction cancelled by the client). These entry and exit points connect the various services together to form the application. Advantageously, this connection is made by pulling a connection between two points using the mouse. There may be one or more hooks 306. These hooks are used to interrupt the execution of the service at any time to trigger the execution of one or more other services connected to this hook. When these services end, the interrupted service is resumed.

In the embodiment, the service comprises an identification area 302. This identification area may comprise the service name, a service identifier and a long description of the service. Advantageously, this area includes a button used to open a help page providing details of the service operation to the user.

A service configuration area 303 is available if the service can be configured. This configuration area typically comprises checks, such as drop-down menus, check boxes with multiple or exclusive selection, numeric or text fields, etc. The user can therefore configure each service easily to suit their requirements.

For example, a payment service may allow the user to choose the type of card accepted amongst the contact or contactless smart cards, magnetic and manual entry cards, etc. It may also be used to choose the solutions accepted amongst, for example, VISA, Mastercard, American Express, Discover, JCB, etc. The payment types accepted can also be configured amongst different types (e.g. debit, credit, refund, etc.). Default parameters can also be configured. Hooks may be offered in order to insert other services at certain times during execution of a payment service (e.g. the payment) such as, for example, before inserting the card, after inserting the card, before selecting the application and after selecting the authorisation.

For example, if the user wants to offer their clients the possibility of paying using their own currency instead of the user's default currency, a currency conversion service can be connected to the hook used after inserting the card. Thus, after inserting the card, the client will be able to select a currency, for example the American dollar, instead of the merchant's default currency, for example the euro. The client can then read on the terminal the net amount which will be debited from their bank account in their currency, including any charges such as the exchange rate and the exchange commission.

Figure 4:
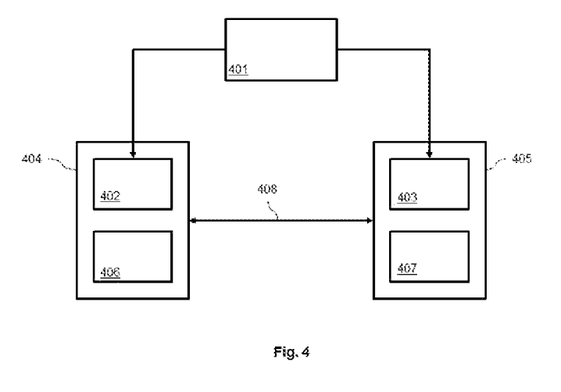
FIG. 4 shows the deployment of the service application according to an embodiment of the invention.

FIG. 4 shows the deployment of the service application according to an embodiment of the invention.

Once the service application 401 has been defined by the user via the programming module 104 using the interface 201, several software modules such as 402 et 403 are generated. The software module 402 is intended to be executed on the payment terminal 404 (or other computer device) under the control of a service orchestra 406. The software module 403 is intended to be executed on the server (or other computer device) within the service execution module 405, corresponding to the module shown on FIG. 1, reference 105. The software module 403 is executed under the control of a service orchestra 407.

In an embodiment, the software modules 402 and 403 consist of a set of resources comprising scripts, files (e.g. images, configuration file, etc.) and a workflow which defines the scheduling of the services. Each script is configured according to the parameters defined by the user. Each service used therefore consists of a first script executed on the payment terminal (or other computer device) and a second script executed on the platform (or other computer device). At least one computer device is required. These scripts cooperate via the connection 408 between the computer devices. The script may also cooperate with external services as explained in relation with FIG. 1. Thus, the user of the payment terminal uses an application which seems to be executed on said terminal but which in fact implements software modules local to the terminal, others on the service platform and potentially external services.

The service orchestras 406 et 407, which are executed respectively on the computer devices, are responsible for executing the various scripts forming the various services according to the defined workflow. These service orchestras also execute the scripts with the parameters corresponding to the application programming carried out in the programming module 104.

The scripts which are executed on the computer devices may be programmed in the same script language or in different languages depending on the embodiments of the invention. This choice depends on the software choices made for the payment terminal and for the platform in terms of operating system and software environment. These script languages include, for example, Javascript, Lua, Python, Kotlin, Groovy, etc. In some embodiments, real executable programs can be compiled instead of scripts.

Figure 5:
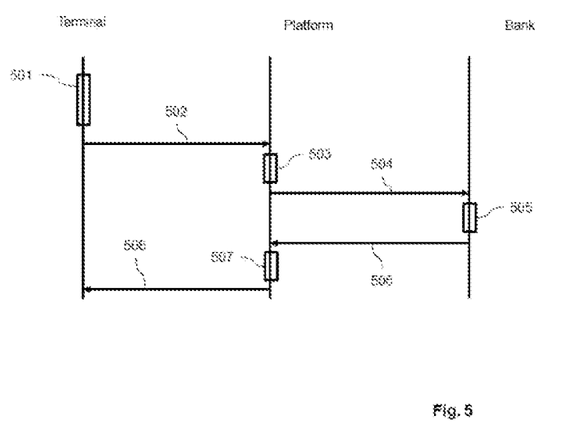
FIG. 5 shows the execution of a service, in this case the payment service according to an embodiment of the invention.

FIG. 5 shows the execution of a service, in this case the payment service according to an embodiment of the invention.

The terminal initiates the execution of the service using the processing block 501. During this processing, a check is first made to ensure that the amount and the currency are provided when starting the service and that the values are correct. For example, the amount must be greater than one euro and the currency must be the euro. The processing block 501 then requests the client to insert the card. The card is then read and its default currency is extracted. If an external service is connected to the hook "after inserting the card", then this service is triggered. The client's PIN code is then checked. If verification of the client's PIN code is successful, an authorisation request 502 is transmitted to the corresponding script which is executed on the platform.

This script which is executed on the platform performs a processing block 503. This processing block selects the bank which will process the payment. To do this, the script which is executed on the platform must call other services available on this platform. For example, the platform comprises a database referencing the banks with which the merchant has signed an acquisition contract. This database also contains the technical information required to connect to the banks, such as the main and secondary IP addresses and the connection identifiers. Advantageously, the acquisition contracts may be modelled in order to determine which bank is the most competitive for a given transaction type. For example, a "VISA" international payment may be less expensive with one bank while a "Mastercard" payment may be less expensive with another bank.

Based on all this information, the processing module 503 chooses a bank and transmits the payment request 504 to said bank. The chosen bank then processes the request during a processing operation 505. After this processing operation, the payment is validated or refused. The bank transmits this result during a response 506 to the platform. During a processing operation 507, the platform retransmits the response 508 to the payment terminal.

Figure 6:
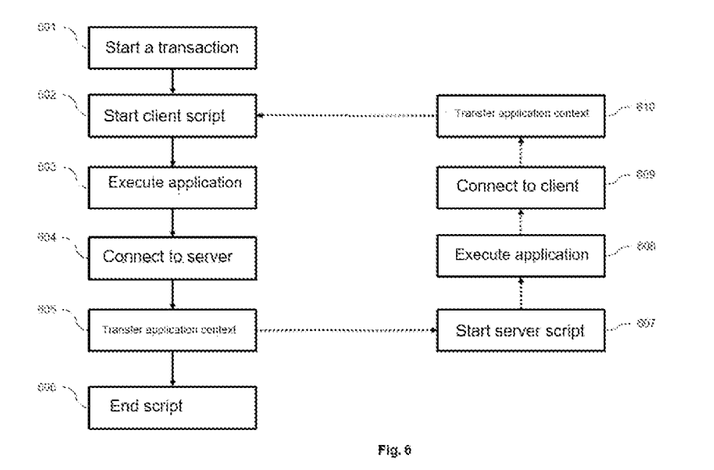
FIG. 6 shows the main steps of executing a service application according to an embodiment of the invention.

FIG. 6 shows the main steps of executing a service application according to an embodiment of the invention.

During a step 601, a transaction is started.

During a step 602, the payment terminal service orchestra starts the first script forming the application. The terminal service orchestra is responsible for starting the services successively as they are executed on the payment terminal or the computer device.

During a step 603, the application is executed.

During a step 604, if one of the services requires a connection to the platform, this connection is initiated by the service. To do this, a strong authentication may be used to authenticate the payment terminal with the platform. Advantageously, this authentication uses a cryptographic system (e.g. asymmetric keys) managed within a hardware secure module. This hardware secure module consists of a physical part and a software part responsible for protecting the cryptographic keys and operations. Any logical or physical intrusion attempt made on a hardware secure module may immediately erase the cryptographic keys it contains. Such a hardware secure module is functionally very similar to a smart card, but with a greater processing capacity.

During the step 605, the application context, in other words, typically, the list of data captured and/or generated by the application, is transferred to the server.

During the step 607, the platform service orchestra identifies the server script corresponding to the service application using the payment terminal identification and starts it with the associated parameters.

During the step 608, the application is executed by orchestration of the various service scripts on the payment terminal and on the platform. If necessary, the scripts executed on the platform call the external services as described in relation with FIG. 5.

During the step 609, symmetric to the step 604, the server initiates a connection to the client.

During the step 610, symmetric to the step 605, the server application context is transferred to the client.

The steps 602 to 610 can be executed any number of times, as required by the application.

During the step 606, at the end of the application, the client script initiates the end of execution. The platform is informed of the end of execution and can then release the resources used by the script on the platform.

In an embodiment, a given service orchestra is deployed on the client and the server(s). The application is then seen as a set of one or more software modules executed on one or more computer devices and cooperating together, as required by the application. Switching from one device to another is carried out as shown on FIG. 6 between the client and the server. The transaction can then be initiated indifferently by either one of these software modules.

In a first example, a chain store could deploy one instance of the service orchestra on each payment terminal, one instance of the service orchestra on a server within each store and one instance on a remote central server. The application would then consist of all the software modules executed on each of these instances of the service orchestra.

In a second example, an instance of the service orchestra would be deployed on each payment terminal, only one of these terminals would be connected to the Internet. The instance deployed on the payment terminal connected to the Internet would then act as proxy for the other instances. Several terminals then cooperate to make the transaction.

In a third example, a store is equipped with a screen provided with an NFC reader, and a payment terminal provided with all the means required to validate a payment which communicates with a remote server. These three devices are equipped with an instance of the service orchestra and cooperate to make the transaction.

Figure 7:
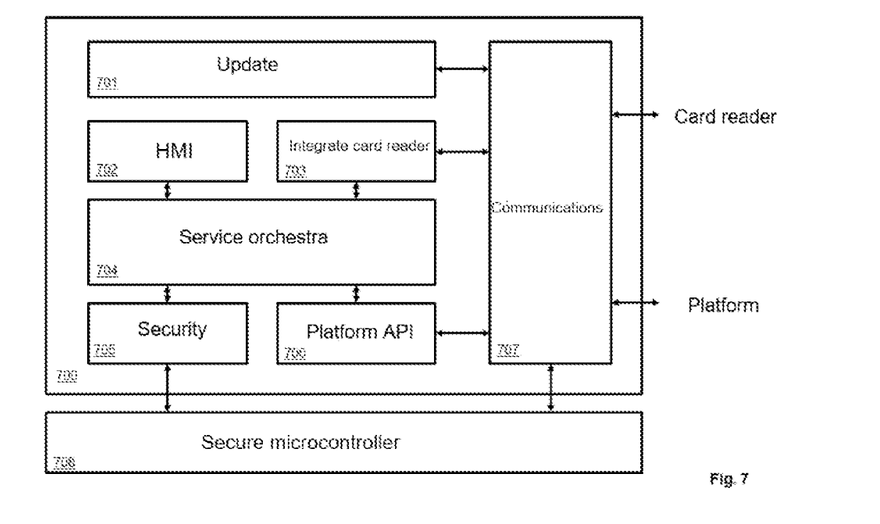
FIG. 7 shows the software architecture of the payment terminal according to an embodiment of the invention.

FIG. 7 shows the software architecture of the payment terminal according to an embodiment of the invention.

In the embodiment of the invention described here, the payment terminal operates under the control of the Google Android operating system (registered trademarks). This operating system 700 is used to operate a set of software modules required to operate the service applications according to the embodiment of the invention. These modules are implemented as one or more Android applications, depending on the embodiments.

The central module is the service orchestra 704. This module loads the various scripts forming the service application, in order to execute and schedule them. To do this, the service orchestra 704 comprises an engine for executing the chosen script language:

The terminal needs to process scripts which it is the only one to be able to execute since they call resources which are only available in the terminal (e.g. communication with the smart card reader).

Inversely, other scripts can only be executed by the server (e.g. connection to a third-party service hosted outside the server environment and not accessible by the terminal.

In some cases, certain scripts may be executed on either the terminal or the server.

A transaction therefore consists of 3 major elements:

A workflow which describes the sequencing of the scripts and their scope (i.e. execution exclusively by the terminal, the server, or either one)

A set of scripts (clients and server)

A "context" containing all the data captured or generated during a transaction.

The scripts are available in both environments (i.e. terminal and server) before starting a transaction to reduce the time to start the transaction. However, the terminal may also download the scripts and the workflow when starting a transaction.

The service orchestra is responsible for transferring the context from the terminal to the server (and vice versa) during the "handover". The service applications share a certain number of common features provided either by the terminal or by the server. They must all access the payment card reader integrated in the terminal, communicate with the service platform, manage the terminal interface and manage cryptographic operations during their authentication with the platform for example. These common features are supplied by a set of software modules typically grouped into one or more Android applications or "server" services.

A human-machine interface (HMI) 702 provides the functions required to manage the payment terminal screen and the keypad. This module allows the interactions with the client using the terminal.

A security module 705 manages the cryptographic operations required to operate the services. These operations comprise the authentications with the platform and if necessary with third-party services. This security module may interact with a secure microcontroller 708 present in the terminal and acting as secure element, i.e. a hardware component responsible for performing the cryptographic operations as such and storing the keys, this component being provided with security features designed to make it completely secure.

The card reader integration module 703 provides the interactions with the card reader(s) present in the payment terminal. Wired or wireless readers may be used.

The platform interface module 706 provides the communications with the platform. Typically, the module will allow the client script to communicate with the corresponding server script and, via this server script, with any third-party services.

An update module 701 is used to update the workflows, scripts and various modules when new versions are available.

A communication module 707 manages the communications between these various modules and the outside of the payment terminal, and in particular the card reader and the service platform. This module sets up the secure communication channels, for example with the platform.

Figure 8:
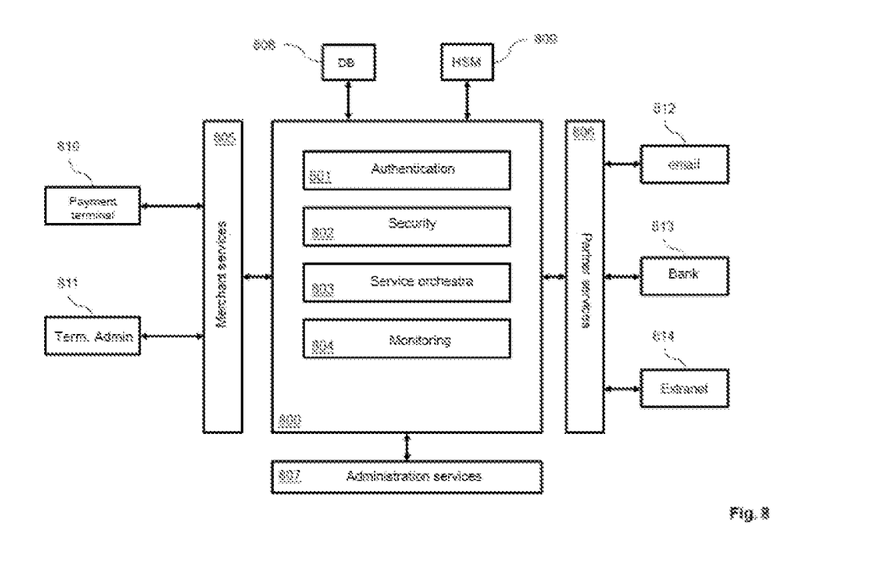
FIG. 8 shows the software architecture of the server platform according to an embodiment of the invention.

FIG. 8 shows the software architecture of the server platform according to an embodiment of the invention. This figure does not show the programming module 104 but only the architecture required to execute the service applications.

The core 800 of the platform consists of a set of modules. These central modules comprise the service orchestra 803 which manages the loading, execution and scheduling of the server scripts of the service application. Server side, it is the equivalent of the service orchestra 704 on the terminal.

Like the terminal architecture, the scripts executed on the platform may use a set of services provided in the form of accessible software modules.

These services comprise an authentication module 801 which manages the authentications. This module typically cooperates with a hardware secure module (HSM) 809. This authentication module manages the cryptographic operations on behalf of all the modules requiring it.

The modules 801 and 802 are the point of access to the module 809. They prepare and optimise the operations delegated to the module 809 (e.g. data conversion from XML or JSON format into a unique binary format adapted to the HSM).

A monitoring module 804 monitors execution of the scripts and use of the various modules and scripts during execution to detect possible anomalies which may occur due to malfunctions or any attacks of the platform.

Other modules are also present, not shown, such as for example a module for logging the technical and business operations performed, a possible protocol translation module, if necessary, to interact with some third-party services, a module for updating the software components. This list is not exhaustive. These services also rely on a database 808 which contains, in particular:

The characteristics of the third-party services (IP address, authentication token, etc.)

The configurations of each bank authorised for each terminal (e.g. merchant contract number, authorised currencies, maximum amounts, etc.)

The list of services authorised for each terminal

The active workflow (and the associated scripts) for each terminal etc.

During its operation, the platform cooperates with external entities. It is therefore equipped with services managing the communication with these external entities. A module 805 manages the communications between the platform and the merchants. This module manages the communication with the payment terminals 810 during execution of the service applications. This module also manages the administration by a merchant of their service from an administration terminal 811. A module 806 manages the communications between the platform and the third-party services. These services are typically requested by the scripts executed by the platform orchestration service during execution of the service applications. These third-party services include, for example, an email management service 812, banking services 813 such as the payment services and the merchant electronic services. These services also include services such as the extranet 814 of a merchant. Some service applications may in fact require data specific to the merchant, for example to apply rules such as granting a promotion according to criteria specific to the merchant or proposing a questionnaire to the clients who have spent less than 100 euros during the month.

The platform also comprises a module 807 which provides access to the manager of the platform for its administration.

In the embodiment, these various modules are implemented as services in a service-oriented architecture (SOA). All these services communicate, for example, via a message broker.

In an embodiment, the operating system is Linux, the hypervisor managing the virtualisation of the servers is Proxmox during development and VMWare during production, the services are managed by Kubernetes/Docker, the message broker is ActiveMQ, the services are developed in Java/Spring, Node.js and/or C/C++, the database can be Cassandra, MongoDB or ElasticSearch.

Thus, the system proposed allows a merchant to quickly define a service application (or workflow) for their payment terminals, and deploy it immediately. This application can then be modified at any time. New services emerging on the market may also be integrated into the platform and provided to the merchants who may then integrate it into their payment application. This can be carried out without having to suffer the costs and delays inherent to the developments of proprietary service applications.

Figure 9:
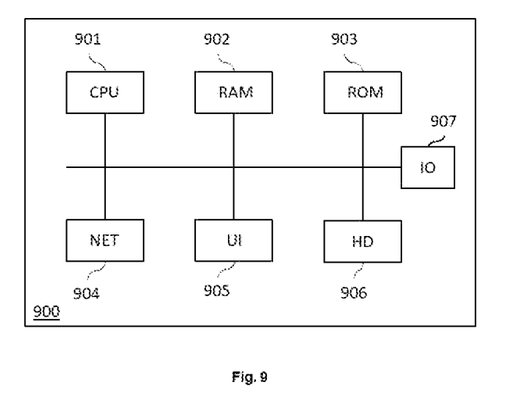
FIG. 9 is a block diagram of an information processing device for the implementation of a payment terminal or a server that can implement the service platform for payment terminals according to several embodiments of the invention.

FIG. 9 is a block diagram of an information processing device 900 for the implementation of one or more embodiments of the invention. The information processing device 900 may be a peripheral such as a microcomputer, a workstation or a mobile telecommunication terminal. The device 900 comprises a communication bus connected to:

a central processing unit (CPU) 901, such as a microprocessor;

a random access memory (RAM) 902, to store the executable code of the method according to the embodiment of the invention as well as the registers adapted to save the variables and parameters required to implement the method according to the embodiments of the invention; the memory size of the device may be increased by an optional RAM connected to an extension port, for example;

a read-only memory (ROM) 903, to store computer programs to implement embodiments of the invention;

a network interface 904 is generally connected to a communication network on which the digital data to be processed is transmitted or received. The network interface 904 may be a single network interface, or consist of a set of different network interfaces (for example wired and wireless, interfaces, or different types of wired or wireless interfaces). Data packets are sent on the network interface for transmission or are read from the network interface for reception under the control of the software application executed in the processor 901;

a user interface 905 to receive inputs from a user or to display information to a user;

a hard drive (HD) 906 as described in the invention;

an input/output module 907 for data reception/transmission from/to external peripherals such as a hard disk, removable storage medium, etc.

The executable code can be stored in a read-only memory 903, on the hard drive 906 or on a digital removable medium such as a disk. According to a variant, the executable codes of the programs can be received using a communication network, via the network interface 904, to be stored in one of the storage means of the communication device 900, such as the hard drive 906, before being executed.

The central processing unit 901 is adapted to control and manage the execution of instructions or software code portions of the program(s) according to one of the embodiments of the invention, the instructions being stored in one of the above-mentioned storage means. After being powered up, the CPU 901 can execute instructions of the main RAM 902, concerning a software application. Such software, when it is executed by the processor 901, triggers the execution of the methods described.

In this embodiment, the device is a programmable device which uses software to implement the invention. However, as an alternative, this invention can be implemented in the hardware (for example as an application-specific integrated circuit (ASIC)).

Obviously, to meet specific requirements, those skilled in the art of the invention could make modifications to the previous description.

While this invention has been described above referring to specific embodiments, said invention is not limited to the specific embodiments and the modifications within the field of application of this invention will be obvious to those skilled in the art.

The invention claimed is:

1. A service platform for payment terminals, comprising:
a graphical programming application for programming a service application for a payment terminal using a set of elementary services accessible from a remote terminal;
the service platform generating, using the service application programmed by the graphical programming application, a client software module executable on a payment terminal and a server software module executable on the service platform;
a network interface for transmitting the client software module to the payment terminal; and
a central processing unit for executing the server software module, the server software module, when executed, cooperating with the client software module executed on the payment terminal to produce the service application.

2. The service platform for payment terminals according to claim 1, wherein the client software module consists of a set of at least one client script.

3. The service platform for payment terminals according to claim 1, wherein:
the server software module consists of a set of at least one server script, and
the service platform comprises a service orchestra module to schedule and execute all the server scripts.

4. The service platform for payment terminals according to claim 1, further comprising a platform interface module for communicating with external services accessible from the server software module.

5. The service platform for payment terminals according to claim 1, further comprising a software module for administering the service platform.

6. The service platform for payment terminals according to claim 1, further comprising a module for managing communications with the payment terminal and the remote terminal.

7. The service platform for payment terminals according to claim 1, further comprising a hardware secure module.

8. The service platform for payment terminals according to claim 1, further comprising a database.

9. The service platform for payment terminals according to claim 1, wherein the graphical programming application displays to a user, via the remote terminal, a list of elementary services that can be selected by the user to program the service application.

10. The service platform for payment terminals according to claim 9, wherein each elementary service is represented by a graphical object comprising at least one input and at least one output, wherein an output of one graphical object is connectable to an input of another graphical object.

11. The service platform for payment terminals according to claim 10, wherein at least one graphical object further comprises a hook, wherein the hook is connectable to an input of another graphical object and an output of another graphical object is connectable to the hook.

12. The service platform for payment terminals according to claim 10, wherein at least one graphical object comprises at least one check box in order to define a parameter of the elementary service represented.

13. A payment terminal, comprising:
a network interface connecting the payment terminal to a service platform, the service platform including a graphical programming application for programming a service application for the payment terminal using a set of elementary services accessible from a remote terminal, the service platform generating, using the service application programmed by the graphical programming application, a client software module executable on the payment terminal and a server software module executable on the service platform, a network interface for transmitting the client software module to the payment terminal, and a central processing unit for executing the server software module, the server software module, when executed, cooperating with the client software module executed on the payment terminal to produce the service application;
a central processing unit for executing the client software module transmitted by the service platform; and
a human machine interface including a screen and a keypad for interacting with the payment terminal.

14. The payment terminal according to claim 13, wherein the client software module consists of a set of at least one client script.

15. The payment terminal according to claim 14, comprising a service orchestra module to schedule and execute all the client scripts.

16. A method for executing a service application within a service application system for payment terminals, the system including a service platform including a graphical programming application for programming a service application for the payment terminal using a set of elementary services accessible from a remote terminal, the service platform generating, using the service application programmed by the graphical programming application, a client software module executable on the payment terminal and a server software module executable on the service platform, a network interface for transmitting the client software module to the payment terminal, and a central processing unit for executing the server software module, the server software module, when executed, cooperating with the client software module executed on the payment terminal to produce the service application, and at least one payment terminal comprising a network interface for connecting to the service platform for payment terminals and a central processing unit for executing the client software module transmitted by the platform, the method comprising:
starting the client software module on the payment terminal;
connecting the payment terminal to the service platform for payment terminals;
starting the server software module on the service platform for payment terminals; and
executing the client software module and the server software module, the client software module and the server software module cooperating to produce the service application.

17. The method according to claim 16, further comprising a step of the client software module terminating the application.

18. The method according to claim 16, further comprising a step of the server software module cooperating with at least one service external to the service platform for payment terminals.

* * * * *